United States Patent
Chun

(10) Patent No.: US 12,490,298 B2
(45) Date of Patent: Dec. 2, 2025

(54) PRACH RECEIVING APPARATUS AND METHOD

(71) Applicant: ELECTRONICS AND TELECOMMUNICATIONS RESEARCH INSTITUTE, Daejeon (KR)

(72) Inventor: Ik Jae Chun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 514 days.

(21) Appl. No.: 17/961,221

(22) Filed: Oct. 6, 2022

(65) Prior Publication Data
US 2023/0112245 A1    Apr. 13, 2023

(30) Foreign Application Priority Data

Oct. 8, 2021  (KR) .................. 10-2021-0134078
Sep. 13, 2022  (KR) .................. 10-2022-0114633

(51) Int. Cl.
| H04W 74/08 | (2024.01) |
| H04W 74/00 | (2009.01) |
| H04W 74/0833 | (2024.01) |

(52) U.S. Cl.
CPC ..... *H04W 74/006* (2013.01); *H04W 74/0833* (2013.01)

(58) Field of Classification Search
None
See application file for complete search history.

(56) References Cited

U.S. PATENT DOCUMENTS

| 8,964,649 | B2 | 2/2015 | Jami et al. | |
| 10,568,144 | B2 | 2/2020 | Cho et al. | |
| 11,076,422 | B2 | 7/2021 | Chen et al. | |
| 11,096,222 | B2 * | 8/2021 | Shin | H04L 5/0053 |
| 2008/0043858 | A1 * | 2/2008 | Lim | H04J 11/00 |
| | | | | 375/260 |
| 2015/0365977 | A1 * | 12/2015 | Tabet | H04W 72/20 |
| | | | | 370/330 |
| 2020/0383139 | A1 | 12/2020 | Ren et al. | |
| 2021/0289559 | A1 * | 9/2021 | Sakhnini | H04L 27/2662 |
| 2021/0307074 | A1 * | 9/2021 | Si | H04W 74/0833 |

(Continued)

FOREIGN PATENT DOCUMENTS

EP    1109326 A1    6/2001

*Primary Examiner* — Hashim S Bhatti
*Assistant Examiner* — Ahmed Saifuddin
(74) *Attorney, Agent, or Firm* — Rabin & Berdo, P.C.

(57) ABSTRACT

A method for receiving a preamble of a physical random access channel (PRACH) may comprise: obtaining information and parameter(s) for receiving a first PRACH preamble from one antenna in an n-th slot, n being an arbitrary natural number; generating a first parameter set including first stage parameters and second stage parameters for controlling processing of the first PRACH preamble; maintaining an activated state of the first stage parameters such that the first stage parameters are applied while the first PRACH preamble is being processed in a first processing part of a data path module; and maintaining an activated state of the second stage parameters such that the second stage parameters are applied while the first PRACH preamble is being processed in a second processing part of the data path module.

20 Claims, 9 Drawing Sheets

(56) References Cited

U.S. PATENT DOCUMENTS

| | | | |
|---|---|---|---|
| 2022/0141876 A1* | 5/2022 | Gorain | H04L 27/2636 370/329 |
| 2022/0383139 A1* | 12/2022 | Jensen | H04M 3/241 |
| 2024/0340972 A1* | 10/2024 | Liu | H04W 74/0836 |

* cited by examiner

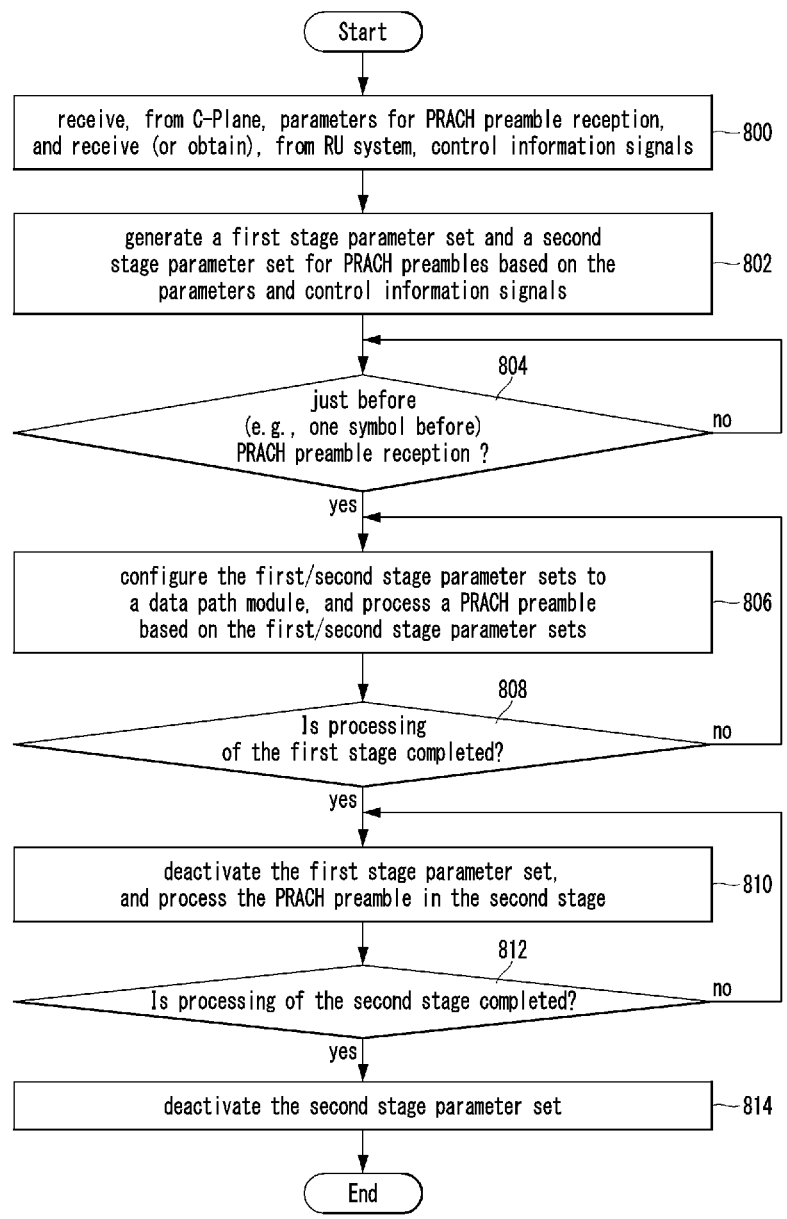

PRACH RECEIVING APPARATUS AND METHOD

CROSS-REFERENCE TO RELATED APPLICATIONS

This application claims priority to Korean Patent Applications No. 10-2021-0134078 filed on Oct. 8, 2021, and No. 10-2022-0114633 filed on Sep. 13, 2022 with the Korean Intellectual Property Office (KIPO), the entire contents of which are hereby incorporated by reference.

BACKGROUND

1. Technical Field

The present disclosure relates to a receiving apparatus and method in a communication system, and more particularly, to an RU PRACH receiving apparatus for supporting a 5G NR functional split 7-2, and a control method therefor.

2. Related Art

The communication system (hereinafter, a new radio (NR) communication system) using a higher frequency band (e.g., a frequency band of 6 GHz or higher) than a frequency band (e.g., a frequency band lower below 6 GHz) of the long term evolution (LTE) (or, LTE-A) is being considered for processing of soaring wireless data. The NR communication system may support not only a frequency band below 6 GHz but also 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like.

Meanwhile, since the LTE became a base service for wireless communications, service providers have been able to meet customer demands for high-capacity and 'always-connected' services due to a variety of new applications and subscribers' high data usage by providing fast setup and switchover time.

To this end, the service providers are accelerating research and development on new hardware and software for radio access network (RAN) upgrades, spectrum reconstruction, and licensed-unlicensed multimode. At the same time, the service providers need a software-controlled RAN with dedicated hardware that can be applied in a variety of ways. To meet such the requirements, the 5G topology has introduced a new scheme of creating and defining a 'multi-split' architecture.

SUMMARY

Accordingly, exemplary embodiments of the present disclosure are directed to providing a PRACH receiving apparatus and a PRACH receiving method in a radio unit (RU) supporting the 5G NR functional split option 7-2.

Accordingly, exemplary embodiments of the present disclosure are also directed to providing a PRACH receiving apparatus and a PRACH receiving method that can reduce manufacturing costs of the RU supporting the 5G NR functional split option 7-2.

Using the PRACH receiving method and the PRACH receiving apparatus according to the present disclosure, a PRACH reception result, for different PRACH formats and different fast Fourier transform (FFT) sizes for PRACH time occasions consecutively received in the time domain, can be smoothly obtained with a minimized delay time.

According to a first exemplary embodiment of the present disclosure, a method for receiving a preamble of a physical random access channel (PRACH) may comprise: obtaining information and parameter(s) for receiving a first PRACH preamble from one antenna in an n-th slot, n being an arbitrary natural number; generating a first parameter set including first stage parameters and second stage parameters for controlling processing of the first PRACH preamble; maintaining an activated state of the first stage parameters such that the first stage parameters are applied while the first PRACH preamble is being processed in a first processing part of a data path module; and maintaining an activated state of the second stage parameters such that the second stage parameters are applied while the first PRACH preamble is being processed in a second processing part of the data path module.

The method may further comprise deactivating the first stage parameters when the processing of the first PRACH preamble is completed in the first processing part.

The method may further comprise: obtaining information and parameter(s) for receiving a second PRACH preamble in an (n+1)-th slot consecutive to the n-th slot; generating a second parameter set including first stage parameters and second stage parameters for controlling processing of the second PRACH preamble; and when applying the second parameter set, suspending activation of the second stage parameters of the second parameter set while the first PRACH preamble is being processed in the second processing part.

The method may further comprise: deactivating the second stage parameters of the first parameter set when the processing of the first PRACH preamble is completed in the second processing part; and activating the second stage parameters of the second parameter set when the second PRACH preamble is processed by the second processing part.

The first processing part may include a cyclic prefix (CP) remover, a frequency shifter, a decimation filter, and a first buffer, and the second processing part may include a fast Fourier transform (FFT) and a second buffer.

When a carrier aggregation scheme is used, the first processing part may further include a channel shifter.

The first parameter set may include a time offset for the PRACH preamble received in the n-th slot, a CP length, a PRACH sample length, a component carrier (CC) offset, a frequency domain occasion number, and a timing for application of the first parameter set to the data path module.

According to a second exemplary embodiment of the present disclosure, an apparatus for receiving a preamble of a physical random access channel (PRACH) may comprise: a radio frequency (RF) front-end for receiving a PRACH preamble from an antenna and providing the received PRACH preamble as digital data; a data path module including a first processing part and a second processing part for processing the PRACH preamble provided from the RF front-end; and a processor for controlling the data path module, wherein the processor causes the apparatus to: obtain information and parameter(s) for receiving a first PRACH preamble from one antenna in an n-th slot, n being an arbitrary natural number; generate a first parameter set including first stage parameters and second stage parameters for controlling processing of the first PRACH preamble; maintain an activated state of the first stage parameters such that the first stage parameters are applied while the first PRACH preamble is being processed in a first processing part of a data path module; and maintain an activated state of the second stage parameters such that the second stage parameters are applied while the first PRACH preamble is being processed in a second processing part of the data path module.

The processor may cause the apparatus to deactivate the first stage parameters when the processing of the first PRACH preamble is completed in the first processing part.

The processor may cause the apparatus to: obtain information and parameter(s) for receiving a second PRACH preamble in an (n+1)-th slot consecutive to the n-th slot; generate a second parameter set including first stage parameters and second stage parameters for controlling processing of the second PRACH preamble; and when applying the second parameter set, suspend activation of the second stage parameters of the second parameter set while the first PRACH preamble is being processed in the second processing part.

The processor may cause the apparatus to: deactivate the second stage parameters of the first parameter set when the processing of the first PRACH preamble is completed in the second processing part; and activate the second stage parameters of the second parameter set when the second PRACH preamble is processed by the second processing part.

The first processing part may include a cyclic prefix (CP) remover, a frequency shifter, a decimation filter, and a first buffer, and the second processing part may include a fast Fourier transform (FFT) and a second buffer.

When the apparatus uses a carrier aggregation scheme, the first processing part may further include a channel shifter.

The first parameter set may include a time offset for the PRACH preamble received in the n-th slot, a CP length, a PRACH sample length, a component carrier (CC) offset, a frequency domain occasion number, and a timing for application of the first parameter set to the data path module.

According to a third exemplary embodiment of the present disclosure, an apparatus for receiving a preamble of a physical random access channel (PRACH) may comprise: a radio frequency (RF) front-end including two or more antennas, receiving a PRACH preamble from each antenna, and converting the received PRACH preamble into digital data; data path modules each corresponding to each antenna and including a first processing part and a second processing part for processing the PRACH preamble converted into digital data from the each antenna; and a processor controlling the data path module, wherein the processor causes the apparatus to, for each data module, obtain information and parameter(s) for receiving a first PRACH preamble from one antenna in an n-th slot, n being an arbitrary natural number; generate a first parameter set including first stage parameters and second stage parameters for controlling processing of the first PRACH preamble; maintain an activated state of the first stage parameters such that the first stage parameters are applied while the first PRACH preamble is being processed in the first processing part of the data path module; and maintain an activated state of the second stage parameters such that the second stage parameters are applied while the first PRACH preamble is being processed in the second processing part of the data path module.

The processor may cause the apparatus to deactivate the first stage parameters when the processing of the first PRACH preamble is completed in the first processing part.

The processor may cause the apparatus to: obtain information and parameter(s) for receiving a second PRACH preamble in an (n+1)-th slot consecutive to the n-th slot; generate a second parameter set including first stage parameters and second stage parameters for controlling processing of the second PRACH preamble; and when applying the second parameter set, suspend activation of the second stage parameters of the second parameter set while the first PRACH preamble is being processed in the second processing part.

The processor may cause the apparatus to: deactivate the second stage parameters of the first parameter set when the processing of the first PRACH preamble is completed in the second processing part; and activate the second stage parameters of the second parameter set when the second PRACH preamble is processed by the second processing part.

The first processing part may include a cyclic prefix (CP) remover, a frequency shifter, a decimation filter, and a first buffer, and the second processing part may include a fast Fourier transform (FFT) and a second buffer.

When the apparatus uses a carrier aggregation scheme, the first processing part may further include a channel shifter.

The present disclosure provides a low-delay PRACH receiving apparatus and PRACH receiving method for RUs supporting the 5G NR functional split option 7-2. Through this, a delay in the PRACH reception can be prevented, and manufacturing costs of the RUs supporting the 5G NR functional split option 7-2 can be reduced. For example, the PRACH receiving apparatus of the present disclosure may have an internal structure having divided stages. Therefore, even if there is a preamble that has not yet been processed in the time domain, a PRACH preamble to be received next can be processed, and even if a PRACH format of the PRACH preamble to be received next is different, the reception of the PRACH preamble currently being processed may not be affected. Accordingly, the PRACH preambles can be processed with a minimum time delay.

BRIEF DESCRIPTION OF DRAWINGS

FIG. 8 is a process flow diagram illustrating a method of receiving and processing a PRACH preamble in an RU system of a base station apparatus according to an exemplary embodiment of the present disclosure.

DETAILED DESCRIPTION OF THE EMBODIMENTS

Figure 1:
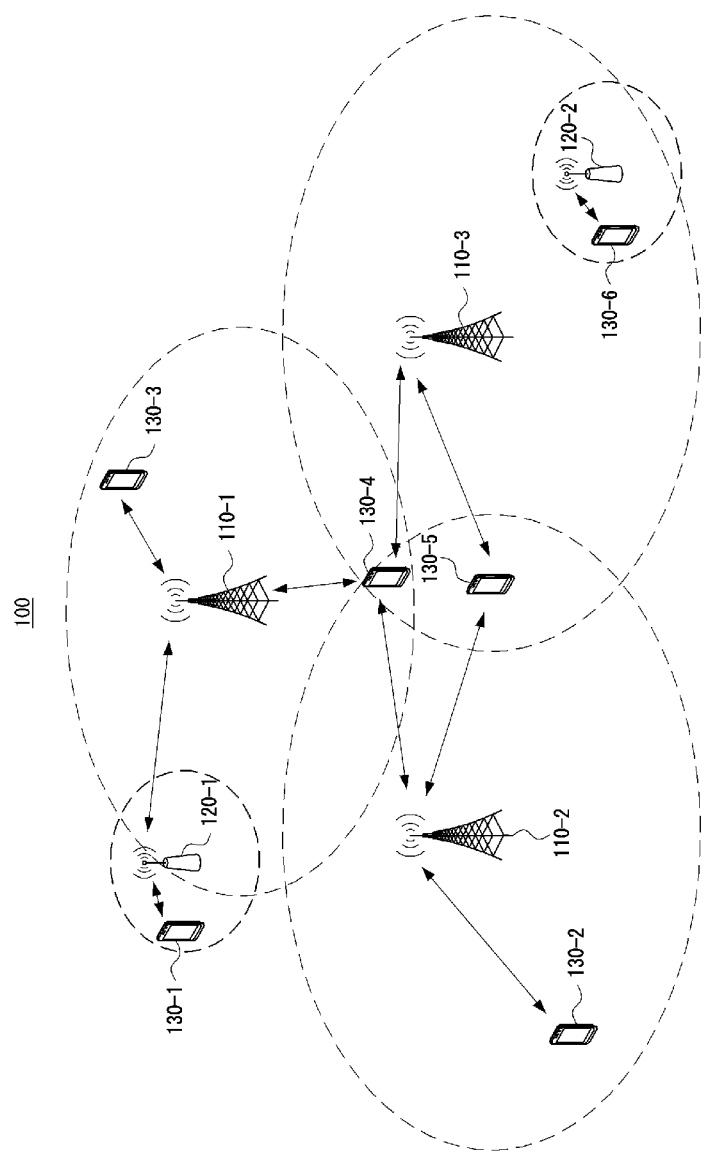
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, 'at least one of A and B' may mean 'at least one of A or B' or 'at least one of combinations of one or more of A and B'. Also, in exemplary embodiments of the present disclosure, 'one or more of A and B' may mean 'one or more of A or B' or 'one or more of combinations of one or more of A and B'.

In exemplary embodiments of the present disclosure, '(re)transmission' may mean 'transmission', 'retransmission', or 'transmission and retransmission', '(re)configuration' may mean 'configuration', 'reconfiguration', or 'configuration and reconfiguration', '(re)connection' may mean 'connection', 'reconnection', or 'connection and reconnection', and '(re-)access' may mean 'access', 're-access', or 'access and re-access'.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
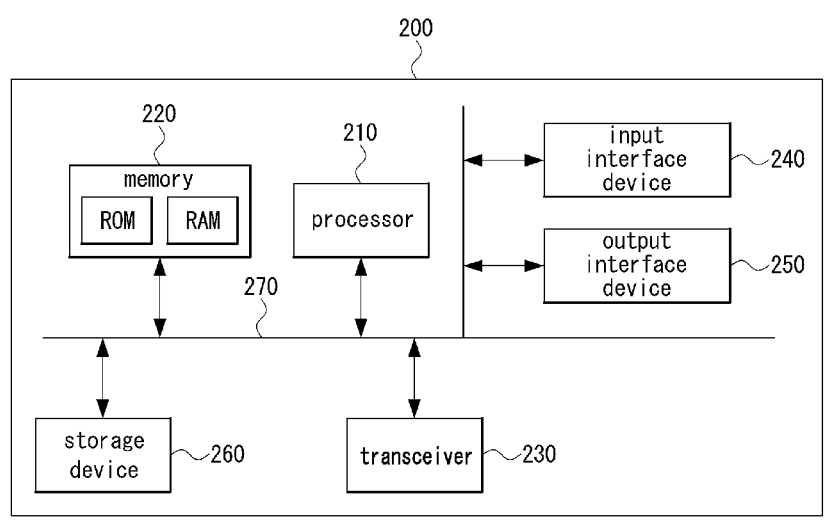
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, a PRACH receiving method and a PRACH receiving apparatus in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g., remote radio transmission/reception function, baseband processing function, and the like) of a communication protocol. Alternatively, the remote radio transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

Meanwhile, wireless communication service providers, for example, mobile network operators, should adaptively install and manage base stations based on geographic characteristics and population density in order to provide high-quality communication services to wireless communication service users. Here, the geographical characteristics may consider factors such as, for example, an area where high-rise buildings are dense, a plain area, an area where high-rise buildings and low-rise buildings are mixed, and a mountain area. Accordingly, a coverage that can be covered by one base station installed by the wireless communication service provider vary. According to characteristics of each area, the wireless communication service provider may need to install more base stations in a specific area than in other areas. This may increase the cost burden on the wireless communication service provider, which is ultimately passed on to the wireless communication service users. Therefore, methods for solving this problem are required.

Meanwhile, since the LTE became a base service for wireless communications, service providers have been able to meet customer demands for high-capacity and 'always-connected' services due to a variety of new applications and subscribers' high data usage by providing fast setup and switchover time.

To this end, the service providers are accelerating research and development on new hardware and software for radio access network (RAN) upgrades, spectrum reconstruction, and licensed-unlicensed multimode. At the same time, the service providers need a software-controlled RAN with dedicated hardware that can be applied in a variety of ways. To meet such the requirements, the 5G topology has introduced a new scheme of creating and defining a 'multi-split' architecture.

In the 3GPP release 15, a flexible architecture for 5G radio access network (RAN) has been defined, and a scheme of splitting a base station or gNodeB (gNB) into three logical nodes such as a central unit (CU), a distributed unit (DU), and a radio unit (RU) has been proposed. In order to adaptively install base stations according to the above scheme, the Open-RAN (O-RAN) alliance is considering split options for RUs and DUs into which a physical layer is split.

In this regard, the O-RAN alliance supports a functional split option 7-2 for networks requiring high capacity and high reliability. This functional split option enables a simplified RU that can be shared by multiple operators and has advantages in size and power consumption when constructing high-density networks. This can ensure host and RU independence, and eCPRI functions executable on Ethernet can provide significant advantages in urban areas and indoor environments such as factories and office blocks where a 5G coverage is required.

The present disclosure describes a physical random access channel (PRACH) receiving structure and internal operations of the RU supporting the 5G NR functional split 7-2 option. In addition, PRACH preambles of various formats can be processed without a reception delay in the time domain through a PRACH receiving structure of the RU, which will be described below. A PRACH receiver for the RU will be referred to as a PRACH filtering unit (PFU) or a PRACH preamble receiver. Therefore, in the following description, the PRACH receiver may mean a physical layer receiver for receiving and processing PRACH preambles in an RU system according to the present disclosure. That is, the PRACH receiver may be a device for receiving a PRACH preamble and performing lower physical layer processing in the RU system.

Figure 3:
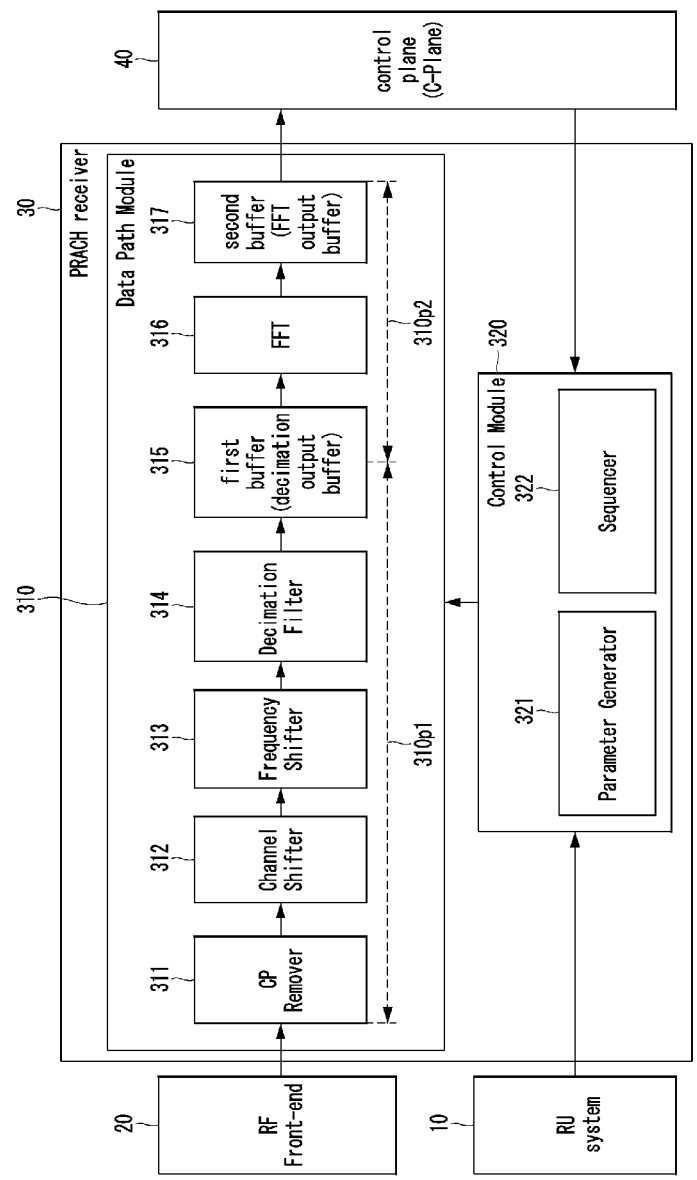
FIG. 3 is a block diagram illustrating a PRACH filtering unit within an RU supporting the functional split option 7-2 for one antenna according to an exemplary embodiment of the present disclosure.

FIG. 3 is a block diagram illustrating a PRACH filtering unit within an RU supporting the functional split option 7-2 for one antenna according to an exemplary embodiment of the present disclosure.

The RU will be briefly described before referring to FIG. 3. The 'option 7' has been developed by the O-RAN alliance as an open fronthaul interface specification. In the option 7, a DU may be in charge of baseband signal processing of a higher physical layer (i.e., High-PHY), such as scrambling and modulation, and an RU may be charge of functions of a lower physical layer (i.e., Low-PHY), such as analog/digital (A/D) conversion, fast Fourier transform (FFT), and the like.

Referring to FIG. 3, a PRACH filtering unit 30 illustrated in FIG. 3 may be substantially included in the RU defined by the open fronthaul interface specification standardized by the O-RAN alliance. An RU system 10 in FIG. 3 may refer to the RU defined by the open fronthaul interface specification of the O-RAN alliance. That is, components of the reference numerals 20 and 30 illustrated in FIG. 3 may be components included in the RU system 10, but since it is difficult to illustrate the entire RU system, it should be noted that the components of the reference numerals 20 and 30 are exemplified as separate components outside the RU system 10 to help understanding of the present disclosure.

Accordingly, the RU system 10 may include at least one of components of the RUs not illustrated in FIG. 3, for example, a digital front-end (DFE) and a synchronization and fronthaul transport component. It should be noted that the RU system 10 exemplified in a separate form in FIG. 3 is an exemplary form for clearly identifying a subject providing signals to be input to the PRACH receiver 30 upon which the present disclosure focuses.

A radio frequency front-end (RF front-end) 20 may be a component for connecting antenna(s) with the PRACH receiver 30. In general, it may include a low noise amplifier (LNA), filters, analog-to-digital converter (ADC), and the like. The RF front-end 20 may output a PRACH preamble as digital data from a radio signal received from the antenna(s). In this case, the PRACH preamble may be composed of orthogonal frequency division multiplexing (OFDM) symbols. Since the RF front-end 20 has a widely known configuration, an additional description will be omitted in the present disclosure, except when necessary.

A control plane (C-Plane) 40 may be a subject that provides control commands or control parameters to the RU according to the O-RAN alliance specifications. These parameters will be described in more detail below.

A PRACH is a physical channel on which a subscriber terminal transmits a preamble for random access to a base station. Therefore, in the following description, the PRACH may be understood as a PRACH preamble, and the PRACH will be described in form of a PRACH preamble in the present disclosure.

According to an exemplary embodiment of the present disclosure, as illustrated in FIG. 3, a basic structure of the PRACH receiver 30 for processing one antenna input may be composed of a control module 320 and a data path module 310.

The control module 320 may include a parameter generator 321 and a sequencer 322. Although the control module 320 is illustrated as including the parameter generator 321 and the sequencer 322, this is merely for convenience of description. When the control module 320 is actually implemented, it may be implemented using a processor capable of performing a role of a controller, or may be implemented using field programmable gate arrays (FPGA). In addition, when implemented using the processor and/or FPGA, a memory (not shown in FIG. 3) for storing instructions of control operations may be further included inside or separately.

The data path module 310 may include a cyclic prefix (CP) remover 311 for removing a CP called cyclic prefix symbols, channel shifter 312, frequency shifter 313, decimation filter 314, first buffer 315 that serves as a decimation output buffer for temporarily storing outputs of the decimation filter 314, FFT 316, and second buffer 317 that serves as an FFT output buffer for temporarily storing outputs of the FFT 316.

The data path module 310 may perform CP removal, frequency shifting, decimation filtering, and FFT according to a time offset, CP length, PRACH sample length, component carrier (CC) offset, frequency domain occasion number, and related timing control signals which are received from the control module 320, and may output results thereof.

The time offset may refer to a clock offset from a start time of an NR slot to a start time at which reception of PRACH samples is to be started, the CP length may refer to the number of CP samples according to a PRACH format, the PRACH sample length may refer to the number of PRACH preamble samples excluding the CP, the CC offset may refer to a PRACH receiving CC in carrier aggregation, and the frequency domain occasion number may indicate a position of a frequency domain occasion for detecting a PRACH within the CC.

Hereinafter, operations of the respective blocks of the data path module 310 will be described.

The CP remover 311 may remove a CP portion from a received RF waveform according to the CP length from a reception start time of the received RF waveform.

The channel shifter 312 may select a specific CC among collectively-received CCs which are carrier-aggregated, and perform frequency shifting of a frequency region of the selected CC from which a PRACH preamble is to be detected, so that a center of the CC is located at a direct current (DC) subcarrier. The channel shifter 312 may not be used in the case of a system using only one CC.

The frequency shifter 313 may move a center of a frequency occasion region from which a PRACH preamble is to be detected within the CC selected through the channel shifter 312 to the DC carrier position. If the size of the FFT 316 covers the entire region of the corresponding CC, the frequency shifting may not be required. However, if the size of the FFT 316 is small to cover the corresponding CC, for example, if the size of the FFT 316 is a size that can cover only one frequency occasion, the frequency shifting may be required.

The decimation filter 314 may serve as a bandpass filter for extracting only one CC band at a front end of the FFT 316 with respect to the data frequency-shifted through the channel shifter 312 and the frequency shifter 313. In addition to the role of the bandpass filter, the decimation filter 314 may perform decimation in consideration of a reception bandwidth to be processed for the extracted one CC band and the size of the FFT 316 to be applied. That is, a decimation factor may be obtained based on a sampling rate for the reception band, the size of the FFT 316 to be applied, and a PRACH subcarrier spacing (SCS). For example, if the PRACH SCS is 30 kHz for a bandwidth for which a reception sampling rate of FR1 is 122.88 MHz, the number of subcarriers may be 4096. If the size of the FFT 316 used for this case is 256, 512, 1204, 2048, or 4096, a decimation filter with a decimation factor 16, 8, 4, 2, or 1 may be applied, respectively, depending on the size of the FFT 316.

Therefore, a plurality of decimation filters based on the respective decimation factors may exist within the decimation filter 314 or may have a form capable of performing decimation based on the variable decimation factor.

The first buffer 315 may be referred to as a 'decimation output buffer'. Hereinafter, the two terms may be used interchangeably. That is, the first buffer may mean the decimation output buffer. The first buffer 315 may perform a role of storing data output through the decimation filter 314 and transferring the data to the FFT 316, and at the same time, may perform a role of separating the operation before the FFT and an operation after the FFT so that they are physically independent from each other. In the present disclosure, the first buffer 315 may be used to maintain connectivity for data outputs according to a change in configuration parameters between a data output timing of the decimation filter 314 and the FFT operation.

The FFT 316 may extract data of a designated frequency band based on the DC center in the frequency domain from the data in the time domain. The PRACH preamble may be processed in units of one CC, and for a 120 kHz PRACH SCS of the 122.88 MHz band, the maximum size of the FFT 316 may become 1024. When a time occasion in which the PRACH preamble receiving operation is performed starts in a symbol immediately following a symbol in which the input of the data in the time domain ends, the reception of the current PRACH preamble and the FFT operation on the previous PRACH preamble may overlap. The sequencer 322 of the control module 320 may control timing scheduling for this case. A detailed operation of the sequencer 322 will be described in more detail below. The sequencer 322 of the control module 320 may reduce a delay in receiving the PRACH preamble by scheduling so that the reception of the current PRACH preamble and the FFT operation on the previous PRACH preamble do not overlap.

The second buffer 317 may be referred to as a 'FFT output buffer'. Hereinafter, the two terms may be used interchangeably for convenience of description. That is, the second buffer may mean the FFT output buffer. The second buffer 317 may transfer data converted into a PRACH sequence in the frequency domain through the FFT 316 in accordance with a C-Plane interface specification. The second buffer 317 may prevent data loss that may occur when a transfer time of the data is different from a transfer request time of the control plane 40, and the output of the FFT 316 may be directly transferred through an interface dedicated for the control plane 40.

In addition, the above-described components constituting the data path module 310 may or may not be included therein. This selection may be based on specifications provided by the wireless communication system. In addition, the data path module 310 may be divided into a first processing part 310p1 and a second processing part 310p2 based on their internal components. Such the division may be determined based on processing speeds in the data path module 310.

For example, the first processing part 310p1 of the data path module 310 may include the CP remover 311, channel shifter 312, frequency shifter 313, decimation filter 314, and first buffer 315. That is, in the first processing part 310p1, the first buffer 315 may store the output of the decimation filter 314.

In addition, the second processing part 310p2 of the data path module 310 may include the FFT 316 and second buffer 317. That is, in the second processing part 316, operations from the output of the first buffer 315 (i.e., the input to the FFT 316) to the output of the FFT 316 (i.e., storing the output of the FFT 316 in the second buffer 317).

In the example of FIG. 3, based on the parameters input from the control plane 40 and system control information signals received from the RU system 10, the control module 320 may generate timing information and operation control signals for output generation of the FFT 316. Accordingly, parameter values necessary for operations of the PRACH receiver 30 may be generated using the PRACH configuration parameters for operation controls input from the control plane 40, and timing control signals for controlling operation timings of the respective components of the data path module 310 may be generated using timing information signals provided from the RU system 10. The signals generated in this manner may be transferred to the respective components of the data path module 310 of the PRACH receiver 30.

The internal registers of the control module 320 may be set one symbol before the reception of the PRACH preamble starts. When the setting of all registers by the control plane 40 is completed, the PRACH receiver 30 may determine a time offset, CP length, PRACH sample length, and FFT size for controlling operation timings by using the parameter generator 321 before the actual PRACH receiving operation starts.

The sequencer 322 may start controlling the operation of the PRACH receiver 30 from a time point at which the setting of the internal registers of the control module 320 by the control plane 40 is completed. According to the present disclosure, the sequencer 322 may identify states of signals output according to operation steps for the respective blocks in the data path module 310 and a data output state of a final output terminal, and may activate or deactivate each component of the data path module 310. Through this, a change in the setting values to be applied to the next operation timing of each block may not affect the current operation, and the setting values may be sequentially applied according to the designated operation timings.

A case in which the sequencer 322 according to the present disclosure controls operations when consecutive PRACH preambles are received will be described as an example. In the data path module 310, while a PRACH preamble received at the previous time point (e.g., slot t−1) is being processed, reception of the next PRACH preamble may start in successive symbols (e.g., slot t). In this case, a final result of the PRACH preamble at the previous time point (i.e., slot t−1) may be being output due to a processing delay time of the FFT 316. Therefore, the sequencer 322 should be able to control the respective blocks of the data path module 310 so that the next PRACH preamble (i.e., the PRACH preamble signal of the slot t) is not input while outputting the result of the PRACH preamble received in the slot t−1. Through this operation, a problem of having to buffer the signal of the current PRACH preamble until the output of the previous PRACH preamble is completed or a problem of having to use parallel PRACH receivers can be solved.

Figure 4:
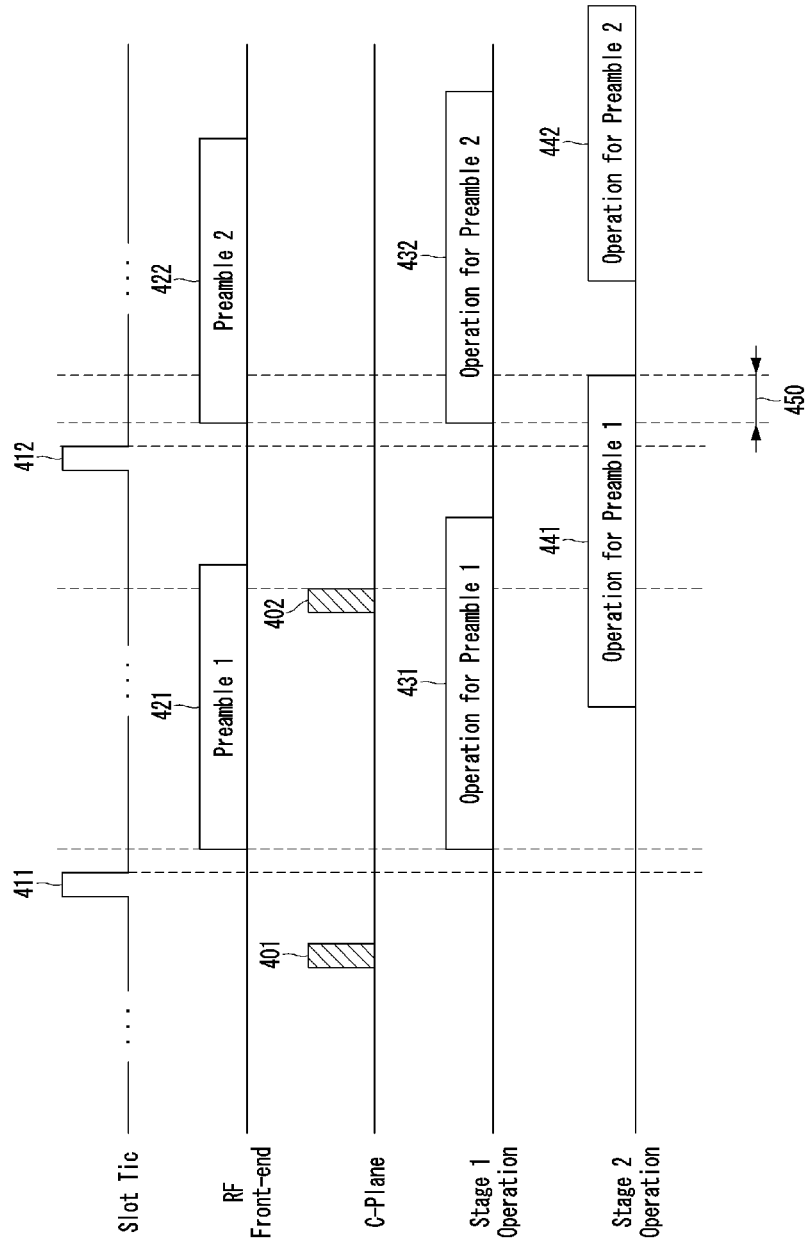
FIG. 4 is a timing diagram for overall operations in which a sequencer according to the present disclosure controls the respective detailed modules of a PRACH receiver.

FIG. 4 is a timing diagram for overall operations in which a sequencer according to the present disclosure controls the respective detailed modules of a PRACH receiver.

According to an exemplary embodiment of the present disclosure, the respective blocks of the data path module 310 for PRACH preamble processing may be divided into a stage 1 and a stage 2 based on delays thereof. In the following description, the terms 'stage 1' and 'first stage' may be used interchangeably and should be interpreted in the same sense.

A first stage according to an exemplary embodiment of the present disclosure may include the CP remover 311, channel shifter 312, frequency shifter 313, and decimation filter 314 which have relatively low delays among the respective constituent blocks of the data path module 310. That is, the operations up to the outputting of the decimation filter 314 may be included in the first stage.

Alternatively, a first stage according to another exemplary embodiment of the present disclosure may include the CP remover 311, channel shifter 312, frequency shifter 313, decimation filter 314, and first buffer 315 which have relatively low delays among the respective constituent blocks of the data path module 310. That is, the operations up to the storing of the output of the decimation filter 314 in the first buffer 315 may be included in the first stage.

A second stage according to an exemplary embodiment of the present disclosure may include the FFT 316 having a relatively large delay among the respective constituent blocks of the data path module 310. That is, the operation of the FFT 316 receiving and processing data may be included in the second stage.

Alternatively, a second stage according to another exemplary embodiment of the present disclosure may include the first buffer 315, the FFT 316, and the second buffer 317 which have relatively large delays among the respective constituent blocks of the data path module 310. That is, the operations of the outputting of the first buffer 315, the processing of the FFT 316, and the storing of the data processed by the FFT 316 in the second buffer 317 may be included in the second stage.

As shown in FIG. 4, even if the setting for the next operation of the PRACH receiver is given by the control plane 40 while the current operation is being performed in the PRACH receiver 30, the setting may be applied when the next operation is to be performed. This may be accomplished by identifying operation timings of the components (or modules or blocks) for each stage and controlling them through the sequencer 322 for smoothly-cooperated operations of the internal components (or modules or blocks) of the PRACH receiver 30. The setting parameters given through the control plane 40 of the RU system 10 may include operation parameters for all the components. The setting parameters given in this manner may be transmitted by identifying parameters required for the corresponding components for each stage according to the operation timings of the corresponding stage.

Then, with reference to FIG. 4, the processing operations of the PRACH preamble for each stage and the timings thereof according to an exemplary embodiment of the present disclosure will be described. In FIG. 4, all the terms 'Preamble' means a PRACH preamble, and in the following description, it can be understood as a PRACH preamble even if the terms 'PRACH preamble' and 'Preamble' are used interchangeably.

A slot tick may be a trigger 411 or 412 for notifying a start of each slot, and may be triggered in units of a period preset by a timer or a time count value.

The processing of a PRACH preamble may start with reception of parameters 401 for PRACH preamble reception from the control plane 40. As described above, the control plane 40 may provide the parameters 401 for PRACH preamble reception to the control module 320 or the parameter generator 321 in the control module 320 one symbol before a PRACH preamble is received. Accordingly, the parameter generator 321 may use the received parameters 401 and parameters received from the RU system 10 to generate parameters for the data path module 310 to process a first preamble 421 (i.e., Preamble 1). Then, the parameter generator 321 may provide the generated parameters for processing the first preamble 421 to the sequencer 322. Accordingly, the sequencer 322 may perform controls according to the first stage and the second stage for receiving the first preamble 421.

Meanwhile, in the present disclosure, a case in which PRACH preambles are received consecutively in time is considered. Accordingly, a PRACH preamble received through one antenna may be received by the PRACH receiver 30 through the RF front-end 20.

In FIG. 4, in order to identify PRACH preambles respectively received in two consecutive slots, the first preamble 421 and a second preamble 422 (i.e., Preamble 2) are distinguished from each other, and the first preamble 421 and the second preamble 422 are both exemplified as signals received from the RF front-end 20.

Then, an operation of the first stage in the data path module 310 for the case when the first preamble 421 is received from the RF front-end 20 will be described.

In the first stage operation, the control module 320 and/or the sequencer 322 may perform controls so that the PRACH preamble input to the data path module 310 of the PRACH receiver 30 through the RF front-end 20 is processed in the first stage for the first preamble 421. The case in which the PRACH preamble is processed in the first stage operation is exemplified by a reference numeral 431 in FIG. 4.

The first stage operation may refer to an operation of controlling the output of the CP remover 311, channel shifter 312, frequency shifter 313, and decimation filter 314, and an operation of storing the output of the decimation filter 314 in the first buffer 315.

In addition, when the first stage operation is performed for a predetermined time, for example, when the first stage operation is performed by an amount that can be processed by the FFT 316, the second stage operation may be performed. The case in which the PRACH preamble is processed in the second stage operation is exemplified by a reference numeral 441 in FIG. 4.

In the second stage operation, the control module 320 and/or the sequencer 322 may perform FFT on the first preamble processed in the first stage. The second stage operation may refer to an operation in which the first preamble processed in the first stage is received from the first buffer 315, the FFT 316 processes the first preamble, and the data processed in the FFT 316 is stored in the second buffer 317.

As described above, the first preamble 421 received from the RF front-end 20 may be processed in the first stage operation 431 and then be processed in the second stage operation 441. Similarly, the second preamble 422 may be processed in a first stage operation 432, and then be processed in a second stage operation 442.

For the above-described controls for the respective stages, operations of the components (or blocks) corresponding to each stage should maintain the current setting values before the operations are completed. This is because, as described above, when the PRACH preambles are received in consecutive slots, it is necessary to prevent reception of the next PRACH preamble before the previously received PRACH preamble is processed.

Specifically, while the second stage is in progress with respect to the first preamble 421, the second preamble 422 may be input from the RF front-end 20 to the data path module 310. In this case, if the parameters for the ongoing second stage 441 for the first preamble are changed to parameters 402 corresponding to the second preamble 422, the first preamble may not be normally processed. That is, a time period in which the second preamble 422 is received, but the second stage processing of the first preamble is not performed, such as a time period indicated by a reference numeral 450 in FIG. 4, may exist. Therefore, for the time period indicated by the reference numeral 450, the processing for the first preamble in the second stage should be performed.

To this end, the sequencer 322 may be configured to transmit a first stage setting parameter activation signal (i.e., Stage1_Set_En) and a second stage setting parameter activation signal (i.e., Stage2_Set_En), which are control signals for maintaining setting values for the respective stages, to the respective components (blocks) in the data path module 310. Through this, the respective components (blocks) in the data path module 310 may apply a first parameter set and a second parameter set by using the signals, and may maintain or change values of the parameters configured according to the respective stages. Accordingly, the respective stages may be performed after the parameters are changed to effective values through the first and second stage parameter set activation signals (i.e., Stage1_Set_En and Stage2_Set_En). An example of activation through the control signals will be described with reference to FIG. 5.

Figure 5A:
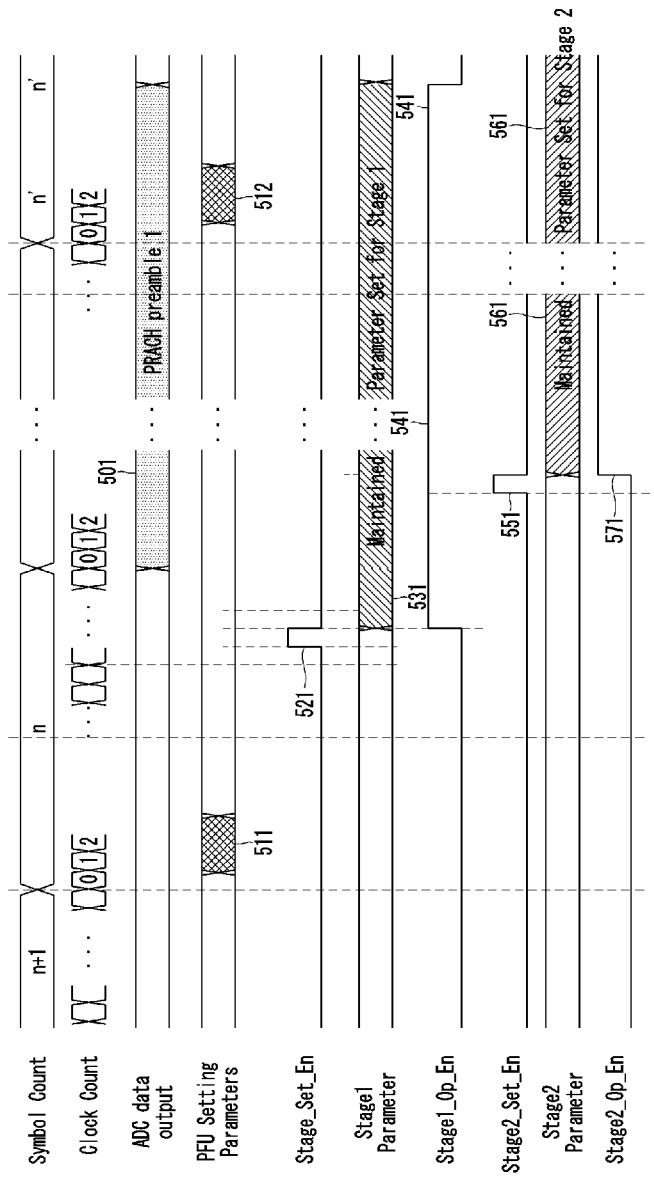
FIGS. 5A and 5B are exemplary diagrams for describing parameter application timing for the respective stages according to an exemplary embodiment of the present disclosure.
Figure 5B:
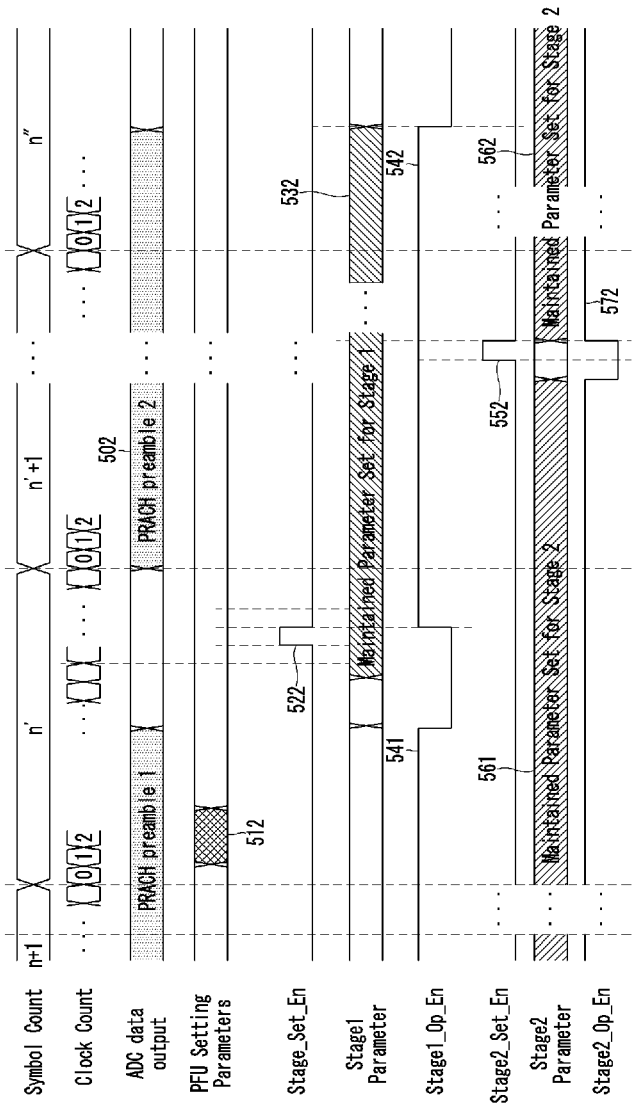

FIGS. 5A and 5B are exemplary diagrams for describing parameter application timing for the respective stages according to an exemplary embodiment of the present disclosure.

Referring to FIGS. 5A and 5B, a case in which successive timings (e.g., timing of FIG. 5A and timing of FIG. 5B applied after the timing of FIG. 5A) partially overlap is exemplified. In FIG. 5A, the horizontal axis means time and illustrates temporal timings at which the respective signals or parameters are set. In addition, it should be noted that some of the continuous timings of FIG. 5A are exemplified (overlapped) again in FIG. 5B to facilitate understanding of the continuous flow of time.

In addition, before referring to FIGS. 5A and 5B, since components or signals not described in FIGS. 3 and 4 are exemplified in FIGS. 5A and 5B, a brief description thereof will be made.

A symbol count may be a value for counting symbols constituting a PRACH preamble. Since the symbol count or a clock count are for counting symbols or clocks using a counter, as well known in the art, detailed descriptions thereof will be omitted.

As described above, the RU and/or the RU system defined in the O-RAN alliance specifications may perform low-level physical layer processing. The RF front-end 20 included in the RU system may include at least one of an LNA, RF processing module for down-converting received signals, and analog-to-digital converter (ADC). Hereinafter, a description will be made on the assumption that the above-mentioned components are included in the RF front-end 20.

Accordingly, the PRACH receiver 30 for PRACH preamble processing may receive digital data converted by the ADC of the RF front-end 20 from a data output port of the ADC. A PRACH preamble 501, which is a data output of the ADC illustrated in FIGS. 5A and 5B, may correspond to the first preamble 421 described with reference to FIG. 4. Similarly, a PRACH preamble 502 may correspond to the second preamble 422 described above with reference to FIG. 4.

PRACH receiver setting parameters (i.e., PFU setting parameters) may be collectively referred to as parameters for the respective blocks in the data path module 310 to process the PRACH preambles in the above-described first stage and the second stage according to the present disclosure.

A first parameter set 511 (i.e., Parameter Set 1) may be a set of parameters for processing the first PRACH preamble 501, and may include parameters for processing the first PRACH preamble 501 in the first stage. In addition, the first parameter set 511 may include parameters for processing the first PRACH preamble 501 in the second stage.

A second parameter set 512 (i.e., Parameter Set 2) may be a set of parameters for processing the second PRACH preamble 502, and may include parameters for processing the second PRACH preamble 502 in the first stage and parameters for processing the second PRACH preamble 502 in the second stage.

As such, the first parameter set 511 and the second parameter set 512 may be configured one symbol before the PRACH preamble is received, based on information received from the control plane 40 and/or information received from the RU system 10.

In FIG. 5A, as described above, the first parameter set to be applied to the first PRACH preamble may be configured in the n-th symbol which is a symbol located one symbol before the first PRACH preamble 511 is received. Accordingly, the PRACH receiver 30 may receive the first PRACH preamble from the ADC from the (n+1)-th symbol. Here, n may be an arbitrary integer. FIGS. 5A and 5B illustrate a case in which the first PRACH preamble is received from the ADC until a part of the n'-th symbol. Here, n' may be an integer greater than n.

In addition, the first stage setting parameter activation signal 521 (i.e., Stage1_Set_En) for activating the output operations of the respective blocks (e.g., CP remover 311, channel shifter 312, frequency shifter 313, and decimation filter 314) and the input operation of the first buffer 315, which correspond to the first stage, may be set in advance before the ADC outputs data. Accordingly, first stage parameters (i.e., Stage 1 Parameter) may be provided to the respective blocks corresponding to the first stage in the data path module 310 before the ADC outputs data, as shown by a reference numeral 531.

In FIGS. 5A and 5B, a case in which a time during which the first stage is maintained is the same as a time during which the ADC outputs the data is exemplified. However, the time during which the first stage is maintained may be longer than the time during which the ADC outputs the data. The time during which the first stage is maintained may be implemented as shown in FIGS. 5A and 5B according to processing times of the components corresponding to the first stage, or may be implemented as a slightly longer time than that.

Therefore, a first stage operation activation signal (i.e., Stage1_Op_En) for notifying a time when the first stage parameters (i.e., Stage 1 Parameter) among the parameters of the first parameter set are effective may be maintained to be activated while data is being output by the ADC. A time during which the first stage operation activation signal is maintained as activated may be determined based on processing times of the respective blocks corresponding to the first stage in the data path module 310, as described above.

In addition, a second stage setting parameter activation signal 551 (i.e., Stage2_Set_En) for activating the second stage may be triggered just before the second stage is performed, and based thereon, a second stage operation activation signal 571 (i.e., Stage2_Op_En) for notifying a time when second stage parameters 561 (i.e., Stage 2 Parameter) are affective may be maintained to be activated while the second stage is being performed. Accordingly, the second stage parameters 561 (i.e., Stage 2 Parameter) may be effective for a time during which the second stage operation activation signal 571 (Stage2_Op_En) is activated. The second stage operation activation signal 571 (Stage2_Op_En) should be maintained for at least the processing time of the FFT 316.

As described above, the setting parameters for controlling the operations of the PRACH receiver transmitted from the RU system 10 may be set at least in a symbol just before a preamble to be processed is input. The parameters set in this manner may be divided into parameters to be applied to the first stage and the second stage, respectively. The respective parameters to be applied to the first stage and the second stage may be applied to the respective stages through the first stage setting parameter activation signal (Stage1_Set_En) and the second stage setting parameter activation signal (Stage2_Set_En). The parameters applied to the corresponding stage may maintain their values while the first stage operation activation signal (Stage1_Op_En) and the second stage operation activation signal (Stage2_Op_En), which are the operation activation control signals of the respective stages, are maintained. In this manner, the operation of the corresponding stage may be maintained until the processing of the received preamble to be processed is completed without changing the parameters.

In the above, the timing for the first PRACH preamble 501 has been described. Hereinafter, an operation according to the reception of the second PRACH preamble will be described.

Basically, description on the above-described operation for the first PRACH preamble 501 may be applied to similarly applied to the operation for the second preamble 502. For example, the second parameter set 512 to be applied to the second PRACH preamble 502 may be triggered based on a first stage setting parameter activation signal (Stage1_Set_En) 522 and a second stage setting parameter activation signal (Stage2_Set_En) 552, and parameters 532 corresponding to the first stage of the second PRACH preamble may be effective for a time during which the first stage operation activation signal 542 (i.e., Stage1_Op_En) is activated. In addition, parameters 562 corresponding to the second stage of the second PRACH preamble are effective for a time during which the second stage operation activation signal 571 (Stage2_Op_En) is activated.

Meanwhile, as previously described with reference to the reference numeral 450 in FIG. 4, in FIGS. 5A and 5B as well, it can be seen that the second PRACH preamble is received while processing for the second stage is being performed with respect to the first PRACH preamble.

As exemplified in FIGS. 5A and 5B, when the second PRACH preamble is input from the ADC to the data path module 310, although the first stage for the first PRACH preamble is terminated, the second stage therefor may not be terminated. Accordingly, the control module 320 may trigger the parameter set for the first stage for the second PRACH preamble, maintain the first stage for the second PRACH preamble in the activated state, and suspend the parameter set for the second stage until the second stage for the first PRACH preamble is completed. FIGS. 5A and 5B illustrate such timing as an example.

FIG. 3 has described the case of having one antenna, and may correspond to a timing diagram for the case of receiving the RPACH preamble received from one antenna. Therefore, a configuration and operations of the RU system in the case of having a plurality of antennas will be described with reference to FIGS. 6 and 7.

Figure 6:
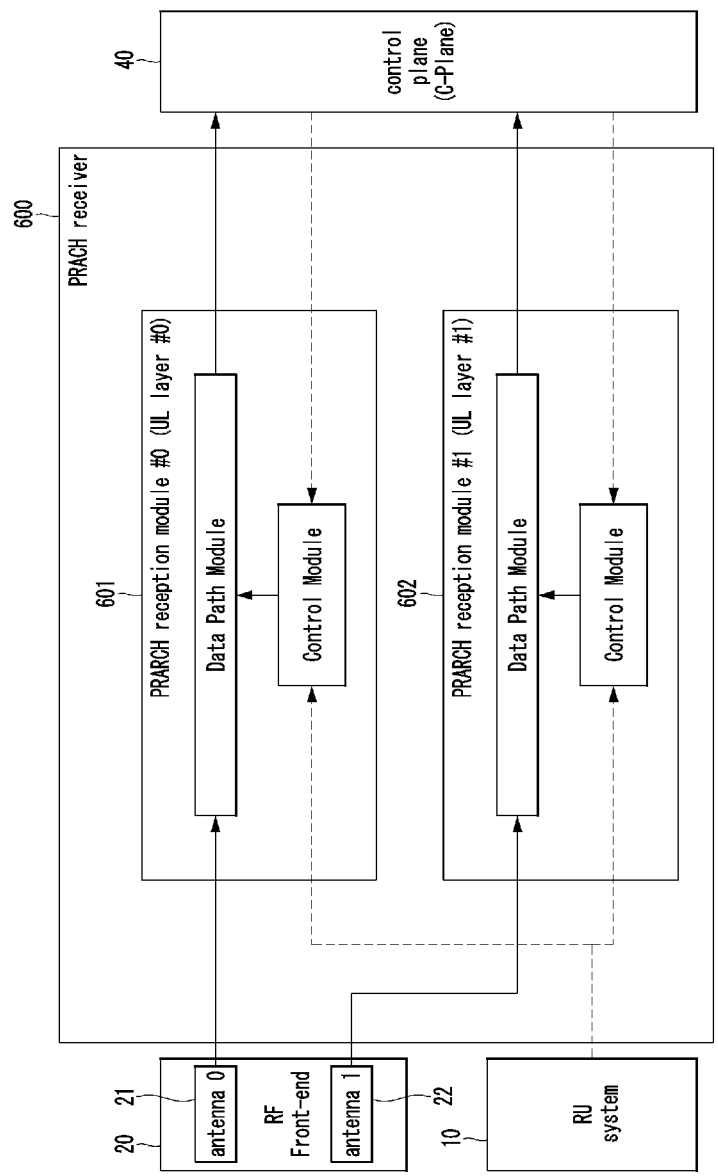
FIG. 6 is a conceptual diagram illustrating a case of having an independent PRACH reception module for each antenna according to an exemplary embodiment of the present disclosure.
Figure 7:
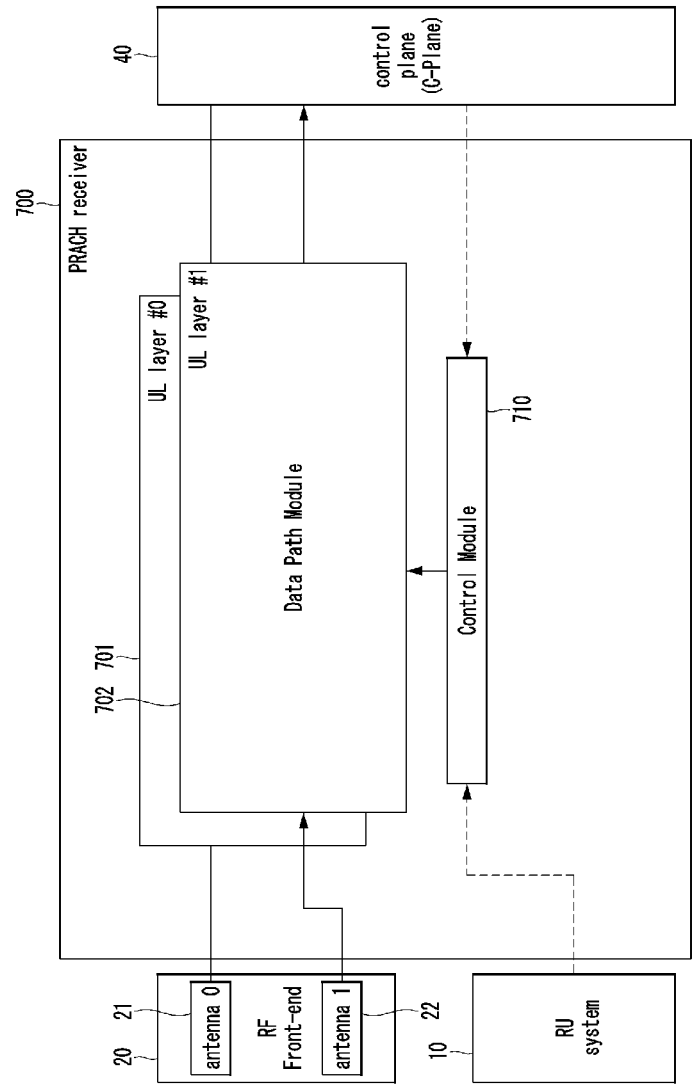
FIG. 7 is a conceptual diagram illustrating a case of having PRACH reception modules sharing a control module according to another exemplary embodiment of the present disclosure.

FIG. 6 is a conceptual diagram illustrating a case of having an independent PRACH reception module for each antenna according to an exemplary embodiment of the present disclosure, and FIG. 7 is a conceptual diagram illustrating a case of having PRACH reception modules sharing a control module according to another exemplary embodiment of the present disclosure.

When implementing an RU supporting the functional split option 7-2 according to the O-RAN alliance, and applying the structure of the PRACH receiver according to the present disclosure, as illustrated in FIG. 6, the PRACH reception modules may be independently configured according to the number of antennas. Alternatively, as shown in FIG. 7, only data path modules respectively connected to the antennas may be configured to be used independently. In the case of FIG. 6, independent data may be transmitted by separately controlling a reception result of each antenna. FIG. 7 shows a structure using a common control module 710 that simultaneously controls data path modules 701 and 702 connected to multiple antennas. In this structure, the data path modules independently operating in response to the respective antennas may be controlled with the same timing through the one control module 710.

Referring to FIG. 6, a case in which the RF front-end 20 has two different antennas (i.e., Antenna 0 and Antenna 1) is exemplified. Accordingly, the PRACH receiver 600 exemplifies a form of processing in one uplink layer corresponding to one antenna, unlike that described in FIG. 3. Specifically, a PRACH reception module 601 for processing an uplink layer #0 corresponding to the first antenna (i.e., Antenna 0) and a PRACH reception module 602 for processing an uplink layer #1 corresponding to the second antenna (i.e., Antenna 1) may be configured separately. When only the uplink layer #0 or uplink layer #1 is considered, it may have the same form as described with reference to FIG. 3.

The PRACH receiver 600 may include the PRACH reception module 601 for processing the uplink layer #0 corresponding to the first antenna 21, and the PRACH reception module 602 for processing the uplink layer #1 corresponding to the second antenna 22. Here, each of the PRACH reception module 601 for processing the uplink layer #0 and the PRACH reception module 602 for processing the uplink layer #1 may include the data path module 310 and the control module 320 described with reference to FIG. 3. Since the data path module 310 and the control module 320 have already been exemplified and described in FIG. 3, additional examples and descriptions are omitted in FIG. 6. In addition, since the corresponding control timing has also been described with reference to FIGS. 4 and 5, the overlapping description will be omitted.

In FIG. 6, only two different antennas are exemplified in the RF front-end 20 for convenience of description. However, the larger number of antennas may be used according to a specification of the wireless communication system. In this case, the number of uplink layers each including the data path module and the control module may also be increased in proportion to the number of antennas.

The case of FIG. 7 may be the same as that of FIG. 6 in that it has two different antennas 21 and 22. However, in the PRACH receiver 700, the data path modules 701 and 702 may be configured to correspond to the respective antennas 21 and 22, and both of the data path modules 701 and 702 may be controlled by one control module 710.

The data path modules 701 and 702 may have the same structure as the data path module 310 described with reference to FIG. 3. Also, the data path modules 701 and 702 may be controlled by one control module 710. The control module 710 may also have the same structure as the control module 320 described with reference to FIG. 3. Accordingly, the data modules 701 and 702 may be equally controlled by one control module 710.

For example, the data path module 701 of the uplink layer #0 corresponding to a PRACH preamble received from the antenna 21 may be controlled by the control module 710 in the same manner as described in FIGS. 4 and 5.

In addition, the data path module 702 of the uplink layer #1 corresponding to a PRACH preamble received from the antenna 22 may be controlled by the control module 710 in the same manner as described in FIGS. 4 and 5.

Accordingly, the control module 710 may control the data path module 701 of the uplink layer #0 corresponding to a PRACH preamble received from the antenna 21 and the data path module 702 of the uplink layer #1 corresponding to a PRACH preamble received from the antenna 22 with the same timing and/or in the same manner.

In FIGS. 6 and 7 as described above, the RU system 10 may be configured in the same manner as described above with reference to FIG. 3. For example, the RU system 10 illustrated in FIGS. 6 and 7 may include the components described in FIG. 6 or 7, for example, the RF front-end 20 and the PFU (i.e., PRACH receiver) 600 and/or 700. It should be noted that the RU system 10 is represented and illustrated as a separate block in order to clearly express control signals received from the remaining components of the RU system that are not exemplified as the operations and features of the present disclosure. In addition, when the control module is implemented with a processor and/or FPGA, it may further include or separately include a memory for storing instructions.

FIG. 8 is a process flow diagram illustrating a method of receiving and processing a PRACH preamble in an RU system of a base station apparatus according to an exemplary embodiment of the present disclosure.

Hereinafter, in describing the process flow diagram of FIG. 8, it will be described using the configuration of FIG. 3 described above. In addition, the process flow diagram of FIG. 8 may describe an operation in the PFU 30 which is a PRACH filtering unit (PRACH receiver).

In a step 800, the control module 320 may receive parameters for PRACH preamble reception from the control plane 40. In addition, it may receive a control information signal from the RU system 10. Each of the respective parameters may be directly received from the parameter generator 321 of the control module 320, received through the sequencer 322, or received through other control components not illustrated in FIG. 3.

In a step 802, based on the parameters received from the control plane 40 and the control information signal received from the RU system 10, the parameter generator 321 of the control module 320 may generate the first stage parameter set and the second stage parameter set according to the exemplary embodiments of the present disclosure. Each of the first stage parameter set and the second stage parameter set may include at least one of a time offset, CP length, PRACH sample length, FFT size, or combinations thereof. In addition, according to the present disclosure, each of them may include information on a time at which the first stage parameter set or the second stage parameter set is to be activated.

In a step 804, the control module 320 may identify whether the current symbol time point is just before (e.g., one symbol before) PRACH preamble reception. This identification may be performed by identifying whether the last symbol before a start of a new slot starts by using the timing information of slot ticks described in FIG. 4 and the symbol count value described in FIG. 5. In addition, the identification operation of the step 804 may be performed by the control module 320 or may be performed by the sequencer 322 in the control module 320. In particular, as described in the preceding block diagram and timing diagram, since the control module 320 receives the parameters for PRACH preamble reception from the control plane 40, if a PRACH preamble is not received in a specific slot, the operation of FIG. 8 may be skipped.

If a result of the identification in the step 804 indicates that the current symbols is a symbol just before PRACH preamble reception is made, the control module 320 may proceed to a step 806, otherwise, the control module 320 may continuously monitors every symbol by repeatedly performing the step 804.

In the step 806, the control module 320 may configure the first stage parameter set to the data path module 310 for reception of a PRACH preamble. For example, the control module 320 may trigger a first stage setting parameter activation signal (i.e., Stage1_Set_En), and activate a first stage operation activation signal (i.e., Stage1_Op_En) based on the trigger. Here, the triggering of the first stage setting parameter activation signal (Stage1_Set_En) and the maintaining of the first stage operation activation signal (Stage1_Op_En) may be performed by the sequencer 322 of the control module 320. Since the timing for this has already been described with reference to FIG. 5, an additional description thereof will be omitted.

In step 806, the sequencer 322 of the control module 320 may configure the second stage parameter set to the data path module 310 for reception of a PRACH preamble, trigger a second stage setting parameter activation signal (Stage2_Set_En), and maintain a second stage operation activation signal (Stage2_Op_En) in an activated state. When PRACH preambles are continuously received, the control module 320 may suspend the activation timing of the second stage as described above with reference to FIGS. 4 and 5. Since this has already been described, an additional description thereof will be omitted.

When the step 806 proceeds, the data path module 310 of the PFU 30 may process a PRACH preamble received from the RF front-end 20 by the first stage and the second stage according to the present disclosure.

In a step 808, the control module 320 may identify whether the processing of the first stage according to the present disclosure has ended in the data path module 310. The processing of the first stage may mean the processing before the FFT 316 as described above. This identification may also be performed by the sequencer 322 of the control module 320. As a result of the identification in the step 808, if the processing of the first stage is terminated, a step 810 may be performed, and if the processing of the first stage is continued, the step 806 may be maintained.

In the step 810, the control module 320 may deactivate the first stage parameter set, and perform processing for PRACH preamble reception in the second stage. In the operation of deactivating the first stage parameter set, all parameters in the first stage parameter set may be deactivated by deactivating the first stage operation activation signal (Stage1_Op_En) (e.g., setting it to a low state as exemplified in FIGS. 5A and 5B). FIGS. 5A and 5B exemplify a configuration in which when the first stage operation activation signal (Stage1_Op_En) is in the activated state, a high signal is output, and when the first stage operation activation signal is in the deactivated state, a low signal is output.

In addition, since the procedure for processing the PRACH preamble in the data path module 310 is a form in consideration of a required time in the procedure performed in the order of time, even when the first stage is terminated, the second stage should be continuously maintained. Accordingly, in the step 810, the control module 320 may control the second stage operation activation signal (Stage2_Op_En) to maintain the activated state (high) so that the processing of the PRACH preamble for the second stage is maintained.

In a step 812, the control module 320 may identify whether the processing of the second stage is terminated. As a result of the identification in the step 812, if the processing of the second stage is terminated, a step 814 may be performed to inactivate the second stage parameter set and terminate the PRACH preamble processing procedure. However, if the processing of the second stage is not terminated, the processing for the second stage may be continued in the step 810.

The operation of the control module 320 to deactivate the second stage parameter set in the step 814 may be controlled using the second stage operation activation signal (Stage2_Op_En). Since the second stage operation activation signal (Stage2_Op_En) has been previously described with reference to FIGS. 5A and 5B, an additional description thereof will be omitted.

In the flowchart of FIG. 8 described above, the procedure for receiving one PRACH preamble signal has been described. However, when PRACH preamble signals are continuously received, the step 810 of FIG. 8 may be interpreted as follows.

This will be described in more detail with reference to FIGS. 5A and 5B. When a first PRACH preamble (i.e., PRACH Preamble 1) is received from the (n+1)-th symbol to a part of the n'-th symbol, the processing of the first stage for the first PRACH preamble may be completed before the (n'+1)-th symbol in which a second PRACH preamble (i.e., PRACH Preamble 2) is received. However, the processing of the second stage for the first PRACH preamble may be in progress even in the (n'+1)-th symbol in which the second PRACH preamble is received. Such the processing may mean the operation for PRACH preamble reception.

In this case, the deactivation of the first stage parameter set when proceeding from the step 812 to the step 810 may be understood as maintaining the deactivated state of the first stage parameter set for the first PRACH preamble. Also, the operation of processing the PRACH preamble in the second stage in the step 810 may be understood as maintaining the second stage parameter for the first PRACH preamble. This is because the region indicated by the reference numeral 450 may exist as described above with reference to FIG. 4.

Using the method according to the present disclosure described above, when receiving a PRACH preamble, processing delay can be reduced, and even without a separated configuration for parallel processing, the PRACH preamble can be reliably received.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method for receiving a preamble of a physical random access channel (PRACH), the method comprising:

obtaining information and parameter(s) for receiving a first PRACH preamble from one antenna in an n-th slot, n being an arbitrary natural number;

generating a first parameter set including first stage parameters and second stage parameters for controlling processing of the first PRACH preamble;

maintaining an activated state of the first stage parameters such that first processing parameters for the first PRACH preamble are maintained in a first processing part of a data path module until the processing of the first PRACH preamble is completed in the first processing part, when a second PRACH preamble is received in an (n+1)-th slot consecutive to the n-th slot while the first PRACH preamble is being processed in the first processing part; and maintaining an activated state of the second stage parameters such that second processing parameters for the first PRACH preamble are maintained in a second processing part of the data path module until the processing of the first PRACH preamble is completed in the second processing part, when the second PRACH preamble is received in the (n+1)-th slot while the first PRACH preamble is being processed in the second processing part.

2. The method according to claim 1, further comprising deactivating the first stage parameters when the processing of the first PRACH preamble is completed in the first processing part.

3. The method according to claim 1, further comprising:
obtaining information and parameter(s) for receiving the second PRACH preamble in the (n+1)-th slot;
generating a second parameter set including first stage parameters and second stage parameters for controlling processing of the second PRACH preamble; and
when applying the second parameter set, suspending activation of the second stage parameters of the second parameter set while the first PRACH preamble is being processed in the second processing part.

4. The method according to claim 3, further comprising:
deactivating the second stage parameters of the first parameter set when the processing of the first PRACH preamble is completed in the second processing part; and
activating the second stage parameters of the second parameter set when the second PRACH preamble is processed by the second processing part.

5. The method according to claim 1, wherein the first processing part includes a cyclic prefix (CP) remover, a frequency shifter, a decimation filter, and a first buffer, and the second processing part includes a fast Fourier transform (FFT) and a second buffer.

6. The method according to claim 5, wherein when a carrier aggregation scheme is used, the first processing part further includes a channel shifter.

7. The method according to claim 1, wherein the first parameter set includes a time offset for the PRACH preamble received in the n-th slot, a CP length, a PRACH sample length, a component carrier (CC) offset, a frequency domain occasion number, and a timing for application of the first parameter set to the data path module.

8. An apparatus for receiving a preamble of a physical random access channel (PRACH), the apparatus comprising:
a radio frequency (RF) front-end for receiving a PRACH preamble from an antenna and providing the received PRACH preamble as digital data;
a data path module including a first processing part and a second processing part for processing the PRACH preamble provided from the RF front-end; and
a processor for controlling the data path module,
wherein the processor causes the apparatus to:
obtain information and parameter(s) for receiving a first PRACH preamble from one antenna in an n-th slot, n being an arbitrary natural number;
generate a first parameter set including first stage parameters and second stage parameters for controlling processing of the first PRACH preamble;
maintain an activated state of the first stage parameters such that first processing parameters for the first PRACH preamble are maintained in a first processing part of the data path module until the processing of the first PRACH preamble is completed in the first processing part, when a second PRACH preamble is received in an (n+1)-th slot consecutive to the n-th slot consecutive to the n-th slot while the first PRACH preamble is being processed in the first processing part; and
maintain an activated state of the second stage parameters such that second processing parameters for the first PRACH preamble are maintained in a second processing part of the data path module until the processing of the first PRACH preamble is completed in the second processing part, when the second PRACH preamble is received in the (n+1)-th slot while the first PRACH preamble is being processed in the second processing part.

9. The apparatus according to claim 8, wherein the processor causes the apparatus to deactivate the first stage parameters when the processing of the first PRACH preamble is completed in the first processing part.

10. The apparatus according to claim 8, wherein the processor causes the apparatus to:
obtain information and parameter(s) for receiving the second PRACH preamble in the (n+1)-th slot;
generate a second parameter set including first stage parameters and second stage parameters for controlling processing of the second PRACH preamble; and
when applying the second parameter set, suspend activation of the second stage parameters of the second parameter set while the first PRACH preamble is being processed in the second processing part.

11. The apparatus according to claim 10, wherein the processor causes the apparatus to:
deactivate the second stage parameters of the first parameter set when the processing of the first PRACH preamble is completed in the second processing part; and
activate the second stage parameters of the second parameter set when the second PRACH preamble is processed by the second processing part.

12. The apparatus according to claim 8, wherein the first processing part includes a cyclic prefix (CP) remover, a frequency shifter, a decimation filter, and a first buffer, and the second processing part includes a fast Fourier transform (FFT) and a second buffer.

13. The apparatus according to claim 12, wherein when the apparatus uses a carrier aggregation scheme, the first processing part further includes a channel shifter.

14. The apparatus according to claim 8, wherein the first parameter set includes a time offset for the PRACH preamble received in the n-th slot, a CP length, a PRACH sample length, a component carrier (CC) offset, a frequency domain occasion number, and a timing for application of the first parameter set to the data path module.

15. An apparatus for receiving a preamble of a physical random access channel (PRACH), the apparatus comprising:
a radio frequency (RF) front-end including two or more antennas, receiving a PRACH preamble from each antenna, and converting the received PRACH preamble into digital data;
data path modules each corresponding to each antenna and including a first processing part and a second processing part for processing the PRACH preamble converted into digital data from the each antenna; and
a processor controlling the data path module,
wherein the processor causes the apparatus to, for each data module,
obtain information and parameter(s) for receiving a first PRACH preamble from one antenna in an n-th slot, n being an arbitrary natural number;
generate a first parameter set including first stage parameters and second stage parameters for controlling processing of the first PRACH preamble;
maintain an activated state of the first stage parameters such that first processing parameters for the first PRACH preamble are maintained in the first processing part of the data path module until the processing of the first PRACH preamble is completed in the first processing part, when a second PRACH preamble is received in an (n+1)-th slot consecutive to the n-th slot while the first PRACH preamble is being processed in the first processing part; and maintain an activated state of the second stage parameters such that second processing parameters for the first PRACH preamble are maintained in the second processing part of the data path module until the processing of the first PRACH preamble is completed in the second processing part, when the second PRACH preamble is received in the (n+1)th slot while the first PRACH preamble is being processed in the second processing part.

16. The apparatus according to claim 15, wherein the processor causes the apparatus to deactivate the first stage parameters when the processing of the first PRACH preamble is completed in the first processing part.

17. The apparatus according to claim 15, wherein the processor causes the apparatus to:

obtain information and parameter(s) for receiving a second PRACH preamble in the (n+1)-th slot;

generate a second parameter set including first stage parameters and second stage parameters for controlling processing of the second PRACH preamble; and when applying the second parameter set, suspend activation of the second stage parameters of the second parameter set while the first PRACH preamble is being processed in the second processing part.

18. The apparatus according to claim 17, wherein the processor causes the apparatus to:

deactivate the second stage parameters of the first parameter set when the processing of the first PRACH preamble is completed in the second processing part; and activate the second stage parameters of the second parameter set when the second PRACH preamble is processed by the second processing part.

19. The apparatus according to claim 15, wherein the first processing part includes a cyclic prefix (CP) remover, a frequency shifter, a decimation filter, and a first buffer, and the second processing part includes a fast Fourier transform (FFT) and a second buffer.

20. The apparatus according to claim 19, wherein when the apparatus uses a carrier aggregation scheme, the first processing part further includes a channel shifter.

* * * * *